(12) United States Patent
Hanson

(10) Patent No.: US 6,382,699 B1
(45) Date of Patent: May 7, 2002

(54) TONNEAU COVER BUMPER

(75) Inventor: Mark D. Hanson, Royal Oak, MI (US)

(73) Assignee: The Budd Company, Troy, MI (US)

( * ) Notice: Subject to any disclaimer, the term of this patent is extended or adjusted under 35 U.S.C. 154(b) by 0 days.

(21) Appl. No.: 09/619,407

(22) Filed: Jul. 19, 2000

(51) Int. Cl.[7] .................................................. B60P 7/02
(52) U.S. Cl. .............................. 296/100.09; 296/100.07
(58) Field of Search ....................... 296/100.09, 100.07, 296/100.06, 100.02

(56) References Cited

U.S. PATENT DOCUMENTS

| 3,514,152 A | 5/1970 | Hermon |
| 4,216,990 A | 8/1980 | Musgrove et al. |
| 4,273,377 A | 6/1981 | Alexander |
| RE33,790 E | 1/1992 | Huber |
| 5,632,522 A | 5/1997 | Gaitan et al. |
| 5,636,893 A | 6/1997 | Wheatley et al. |
| 5,653,491 A | 8/1997 | Steffens et al. |
| 6,082,806 A | 7/2000 | Bogard |
| 6,290,441 B1 * | 9/2001 | Rusu ..................... 296/100.07 |

* cited by examiner

Primary Examiner—Joseph D. Pape
(74) Attorney, Agent, or Firm—Harness, Dickey & Pierce, P.L.C.

(57) ABSTRACT

A bumper for a motor vehicle having a tonneau cover moveable from an opened position to a closed position includes an annular body having an inner surface and an outer surface where the inner surface defines a bore. The bumper also includes a rib extending from a first position on the inner surface to a second position on the inner surface within the bore. The bumper is adapted to be mounted to the vehicle and positioned between the tonneau cover and the vehicle when the tonneau cover is in the closed position.

17 Claims, 4 Drawing Sheets

TONNEAU COVER BUMPER

FIELD OF THE INVENTION

The present invention generally relates to a device for coupling a cover to a box of a vehicle having an open cargo area. More particularly, the present invention relates to a tonneau cover bumper mounted on a cargo carrying vehicle.

BACKGROUND OF THE INVENTION

Vehicles such as pick-up trucks having an open cargo area are useful for transporting a wide variety of cargo. However, cargo transported in this type of vehicle is susceptible to environment exposure. Therefore, various tops, caps and tonneau covers have been designed to cover the cargo area and limit the ingress of rain, sleet, snow and the like. In addition, the aforementioned covers prevent egress of cargo as the vehicle is being operated.

An example of one such tonneau cover includes a pair of hard panels pivotally interconnected by a transversely extending hinge. In their closed positions, the panels lie flat on top of a pair of vertical sidewalls defining the cargo area. In other examples, the tonneau cover consists of a plurality of panels folding in a manner similar to an accordion, stackable one against the other. However, existing tonneau covers are not without their disadvantages. One disadvantage relates to the difficulty of providing a latching mechanism to releasably couple the tonneau cover to the vehicle in a manner that will not damage the tonneau cover or the vehicle while restricting movement of the cover relative to the vehicle. Specifically, the structure disclosed in U.S. Pat. No. 5,653,491 to Steffens et al. aligns and latches the cover with the vehicle but does not provide any biasing force or energy damping function. Accordingly, the cover is allowed to repeatedly impact upon the vehicle sidewalls as the vehicle is operated. Other structures rigidly interconnect the cover and the vehicle sidewall such that loads generated from a rough road transmit through the cover into the vehicle thereby reducing the structural durability of one or both of the components.

SUMMARY OF THE INVENTION

Accordingly, it is an object of the present invention to provide a tonneau cover bumper adaptable for use with new or existing vehicles and securable to the vehicle body to align the tonneau cover relative to the vehicle sidewalls.

It is another object of the present invention to provide a tonneau cover bumper to dissipate energy transmitted from the road through the vehicle thereby increasing structural durability of the tonneau cover and the vehicle.

The present invention includes a bumper for a motor vehicle having a tonneau cover moveable from an opened position to a closed position. The bumper includes an annular body having an inner surface and an outer surface where the inner surface defines a bore. The bumper also includes a rib extending from a first position on the inner surface to a second position on the inner surface within the bore. The bumper is adapted to be mounted to the vehicle and positioned between the tonneau cover and the vehicle when the tonneau cover is in the closed position.

Further objects, features and advantages of the present invention will become apparent from consideration of the following description and appended claims, when taken in connection with the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
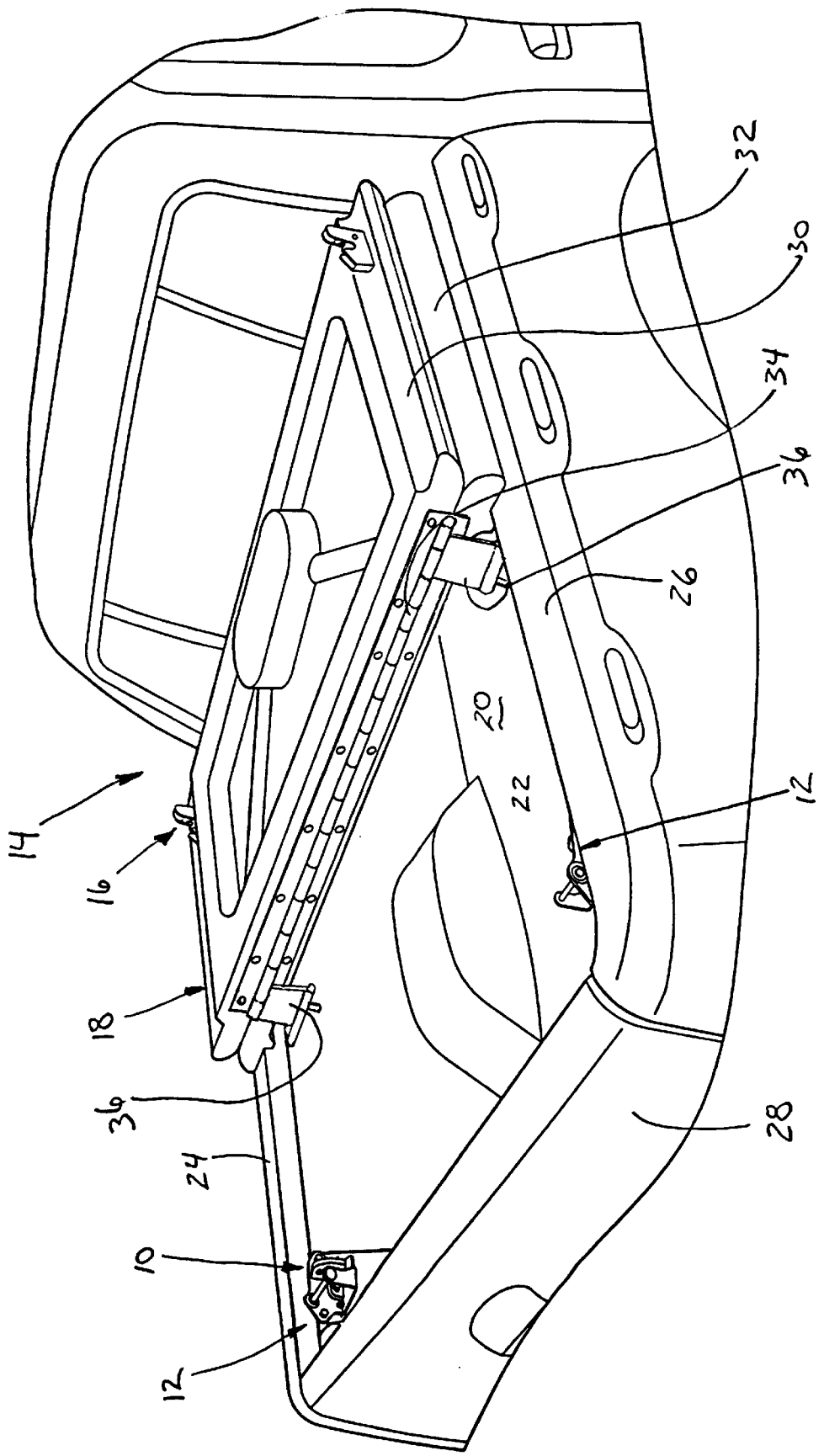
FIG. 1 is a perspective view of an exemplary vehicle equipped with a tonneau cover bumper constructed in accordance with the teachings of the present invention.

With reference to the drawings, a tonneau cover bumper constructed in accordance with the teachings of an embodiment of the present invention is generally identified at reference numeral 10. Tonneau cover bumper 10 is shown operatively associated with a striker assembly 12 coupled to an exemplary motor vehicle 14. Striker assembly 12 cooperates with a latch assembly 16 mounted to a tonneau cover assembly 18. In the preferred embodiment, vehicle 14 is a pick-up truck having a cargo area 20 generally defined by a bed 22, a first sidewall 24, a second sidewall 26 and a tailgate 28.

As best shown in FIG. 1, tonneau cover assembly 18 is illustrated to generally include a first cover 30 and a second cover 32 rotatably interconnected by a hinge 34. Hinge 34 is detachably coupled to a pair of clamp assemblies 36 coupled to first and second sidewalls 24 and 26, respectively. A pair of striker assemblies 12 are rigidly fastened to first and second sidewalls to selectively couple first cover 30 to vehicle 14. Each of the striker assemblies are substantial mirror images of each other. Accordingly, only one striker assembly 12 will be described in detail.

Figure 2:
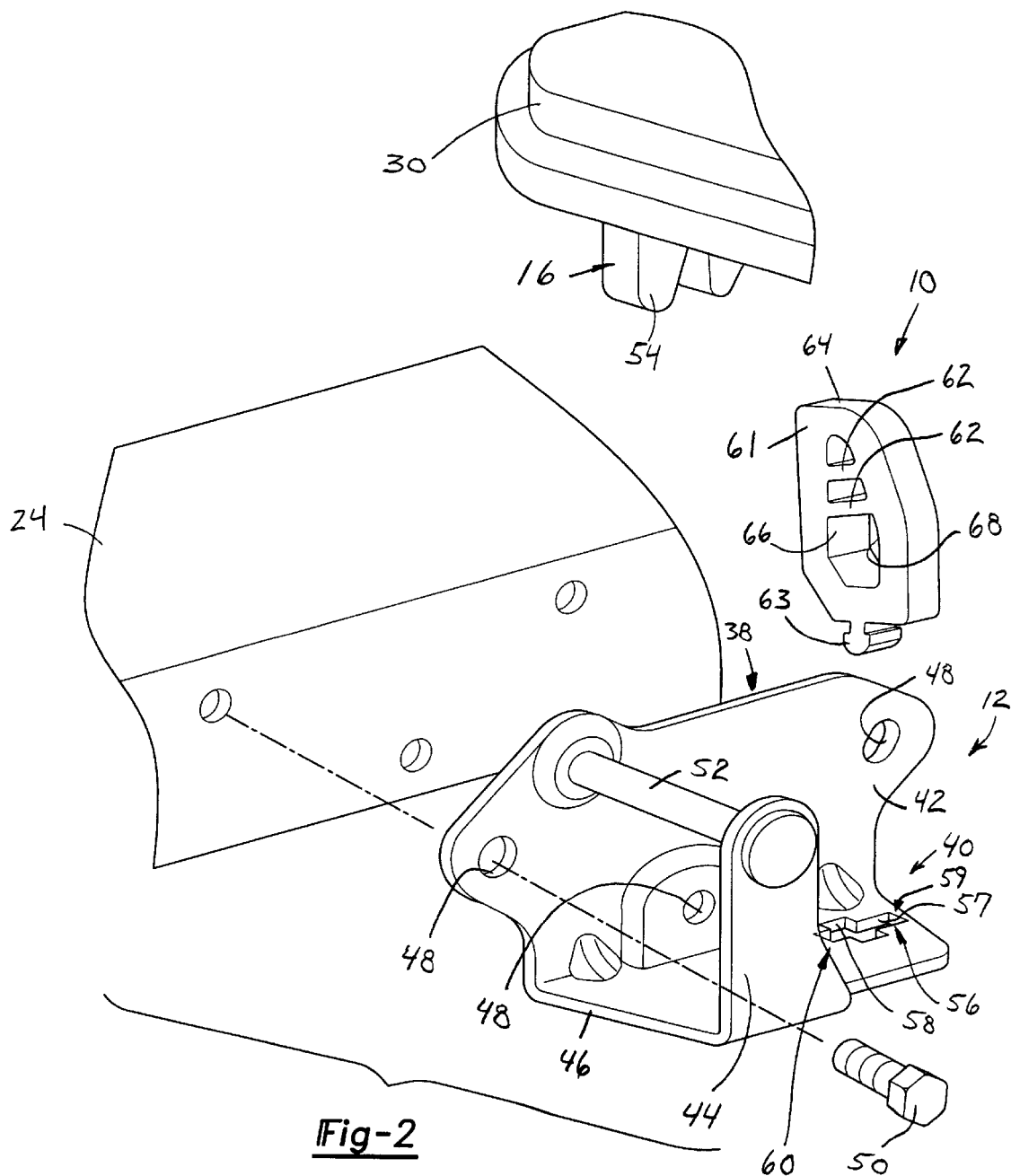
FIG. 2 is an exploded perspective view of a striker assembly having the preferred tonneau cover bumper attached thereto.

With reference to FIG. 2, striker assembly 12 includes a frame 38 constructed from a generally "U" shaped channel 40. Channel 40 includes a first section 42, a second section 44 and an end section 46 interconnecting first section 42 and second section 44. First section 42 includes three apertures 48 each receiving a fastener 50 to interconnect frame 38 with first sidewall 24. First section 42 and second section 44 each include an aperture for receipt of a striker bar 52 spanning first section 42 and second section 44 substantially parallel to end section 46. Striker bar 52 is offset from end section 46 to allow a clasp 54 of latch assembly 16 to rotate about striker bar 52 and couple first cover 30 to striker assembly 12. End section 46 includes a cross-shaped aperture 56 extending therethrough. Cross-shaped aperture 56 includes a first elongated portion 57 and a second elongated portion 58 orthogonally overlying first portion 57. First portion 57 includes a first end 59 and a second end 60. Cross-shaped aperture 56 functions to allow easy assembly and subsequent retention of bumper 10 as will be described in greater detail hereinafter.

Figure 3:
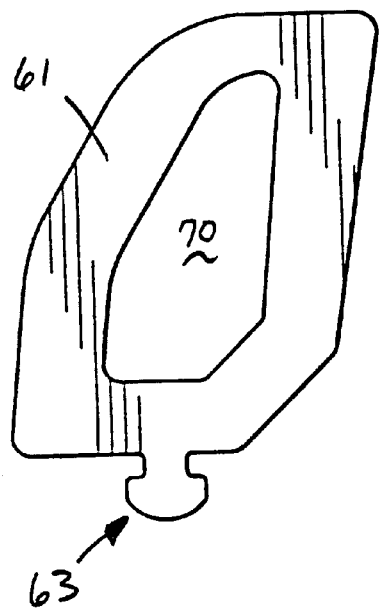
FIG. 3 is a cross-sectional view of a second embodiment of the tonneau cover bumper.

Bumper 10 includes an annular body 61, a pair of ribs 62 and key a 63. Annular body 61 includes an outer surface 64 and an inner surface 66 defining a bore 68. Ribs 62 extend from a first portion of inner surface 66 to a second portion of inner surface 66 spanning bore 68. In the preferred embodiment, two ribs 62 traverse bore 68. However, it should be appreciated that alternate embodiments may include a different number or configuration of ribs without departing from the scope of the present invention. Specifically, a second embodiment is depicted at FIG. 3 as having an open bore 70 with no ribs present. Both embodiments of the bumper of the present invention are preferably constructed from an extruded elastomer cut to length. One example of a feasible elastomeric material is Santoprene 101-64 available from Advanced Elastomer Systems. Preferably, the elastomeric material exhibits a durometer in the range of 55 to 65.

Figure 4:
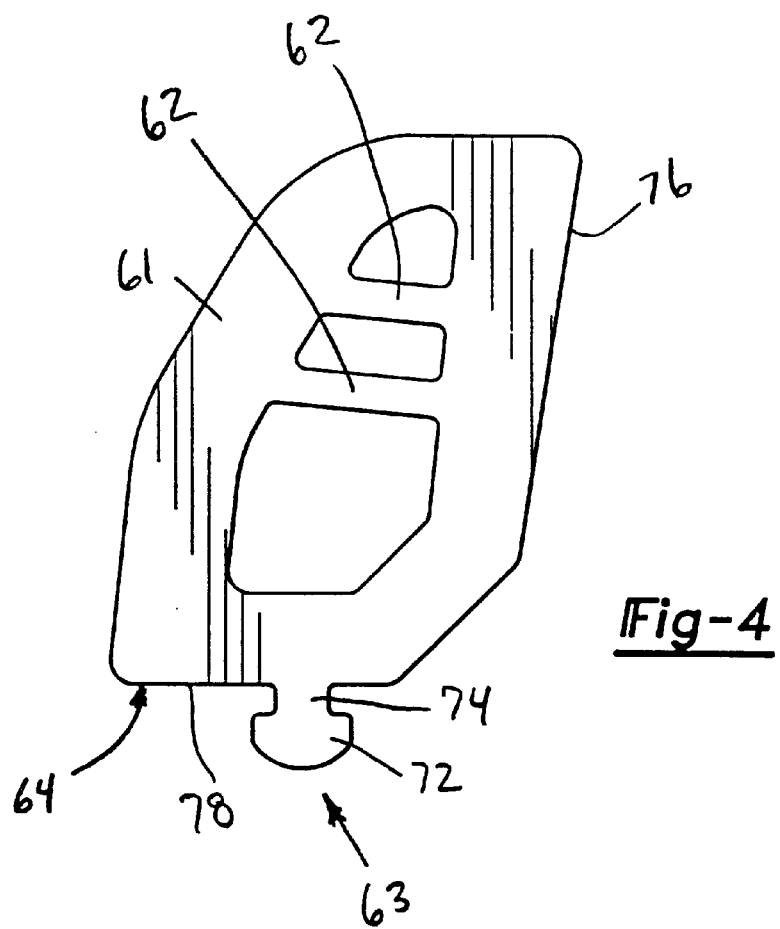
FIG. 4 is a cross-sectional view of the preferred tonneau cover bumper.

As best seen in FIG. 4, key 63 is a generally "T" shaped protrusion extending from outer surface 64 along the entire extruded length of bumper 10. Key 63 includes a top portion 72 integrally formed with a rail portion 74 extending from outer surface 64 of annular body 61. At assembly, top portion 72 and rail portion 74 are disposed within cross-shaped aperture 56 (FIG. 2) and displaced toward first end 59 of first elongated portion 57 to capture end section 46 between outer surface 64 and top portion 72. Once top portion 72 protrudes from end section 46, bumper 10 is axially disposed toward second end 60 to fully engage key 63 with end section 46.

Figure 5:
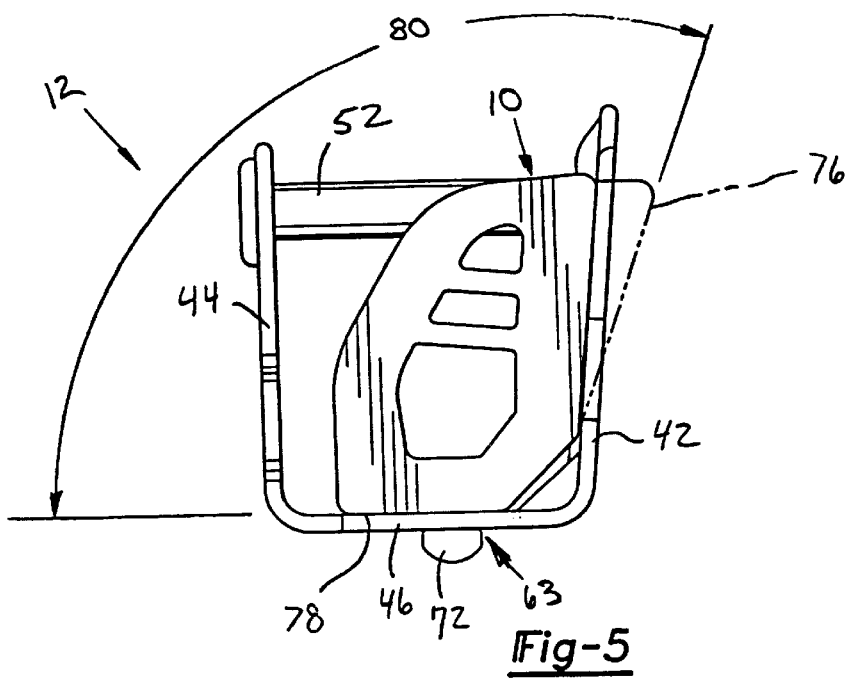
FIG. 5 is an end view of the striker assembly with preferred tonneau cover bumper.

It should be appreciated that as key 63 is being disposed within cross-shaped aperture 56, body 61 deforms to fit within the confines of channel 40 as shown in FIG. 5. Specifically, outer surface 64 of annular body 61 includes a first contact portion 76 and a second contact portion 78. When bumper 10 is in its free, undeformed state, the first and second contact portions form a first angle 80, as depicted in phantom line representation, greater than the angle between first section 42 and end section 46. Thus, once key 63 is disposed within cross-shaped aperture 56, first contact portion 76 is biasedly engaged with first section 42. At this time, striker assembly 12 may be assembled to vehicle 14.

Figure 6:
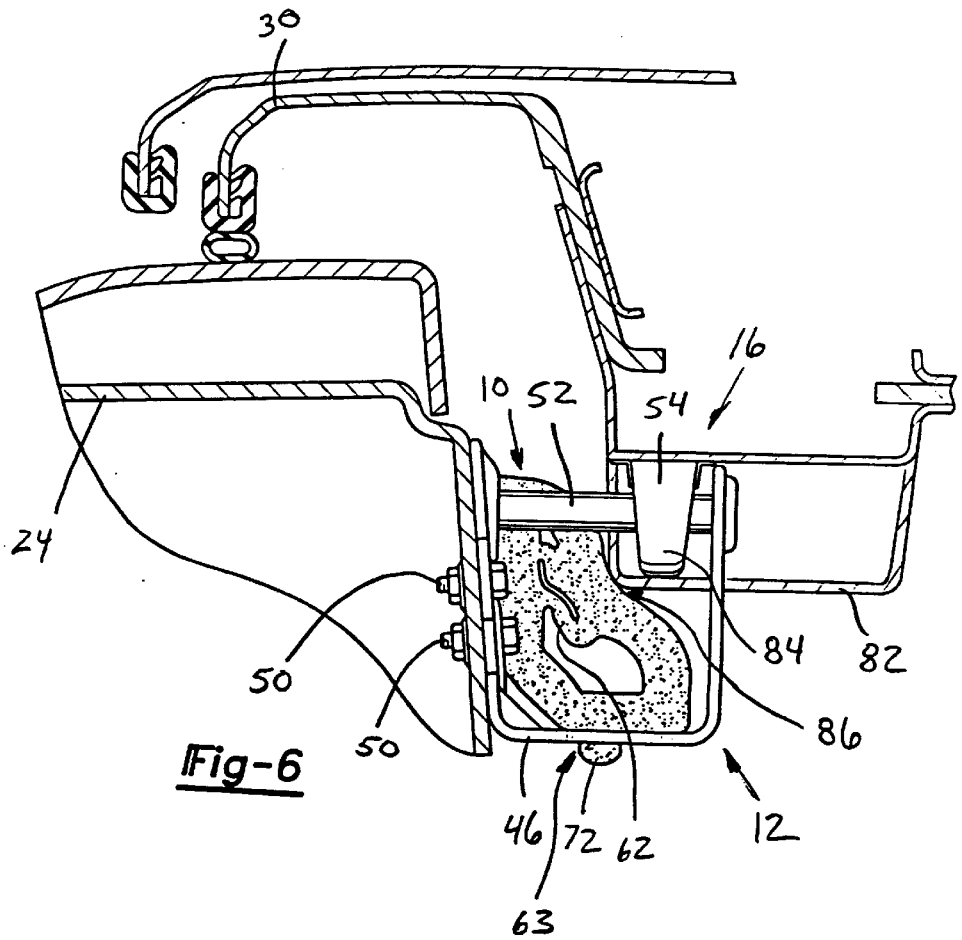
FIG. 6 is a partial sectional view of a vehicle equipped with a tonneau cover and preferred tonneau bumper taken transverse to the vehicle direction of travel.

With reference to FIG. 6, striker assembly 12 is coupled to first sidewall 24 with fasteners 50. First cover 30 is shown in the closed position with latch assembly 16 engaging striker assembly 12. Latch assembly 16 includes a housing 82 mounted to first cover 30 and configured to position clasp 54 in engagement with striker bar 52 when first cover 30 is in the closed position. As first cover 30 is being articulated about hinge 34 from an open position to a nearly closed position, clasp 54 contacts striker bar 52 and rotates such that a hook portion 84 of clasp 54 is positioned between striker bar 52 and end section 46 effectively coupling the cover to the vehicle.

Bumper 10 includes a third contact portion 86 positioned along outer surface 64. Third contact portion 86 is contacted by housing 82 as first cover 30 is closed deforming bumper 10 as shown in FIG. 6. One skilled in the art will appreciate that because bumper 10 has a cooperating mirror image component similarly engaged with another latch housing adjacent to second sidewall 26, bumper 10 functions to position first cover 30 squarely in relation to bed 22 and the overall vehicle. It should also be appreciated that the orientation of third contact surface 86 with relation to housing 82 provides a biasing force engaging clasp 54 with striker bar 52. Accordingly, impact loading and noise due to rattling and intermittent contact of first cover 30 with first sidewall 24 is reduced. Because clasp 54 is in biased engagement with striker bar 52, the effort to unlatch latch assembly 16 from striker assembly 12 is effected. Thus, the preferred embodiment includes an elastomeric material having a durometer ranging from 55 to 65 and two generally parallel ribs 62 extending across bore 68. By constructing bumper 10 in this manner, the bumper provides a damping function by dissipating the force transmitted through housing 82 toward first sidewall 24 and an ease of use function by deforming sufficiently to maintain a low latch release force.

Therefore, it should be appreciated that the configuration and operation of the tonneau cover bumper provides a variety of advantages over the prior art. Specifically, the bumper of the present invention provides a simple, cost effective method of centering tonneau cover panels relative to the bed. Additionally, the tonneau cover bumper provides a damper mechanism for absorbing road load inputs thereby preventing damage to the tonneau cover and the vehicle.

The foregoing discussion discloses and describes merely exemplary embodiments of the present invention. One skilled in the art will readily recognize from such discussion, and from the accompanying drawings and claims, that various changes, modifications and variations may be made therein without departing from the spirit and scope of the invention as defined in the following claims.

I claim:

1. A motor vehicle equipped with a tonneau cover, the tonneau cover being moveable from an opened position to a closed position, the motor vehicle comprising:

a striker assembly having:
    a frame defining a channel, said channel having a first section, a second section and an end section, said frame coupled to said vehicle;
    a striker bar coupled to said frame interconnecting said first section and said second section; and
    a bumper coupled to said frame, said bumper adapted to be positioned between the tonneau cover and said frame to absorb energy transferred therebetween when the tonneau cover is in the closed position.

2. The motor vehicle of claim 1 wherein said bumper includes an annular body defining a bore and a rib traversing said bore.

3. The motor vehicle of claim 2 wherein said bumper includes a key and wherein said end section includes an aperture to receive said key.

4. The motor vehicle of claim 3 wherein said bumper includes an outer surface having a first portion biasedly engaged with said first section when said key is disposed within said aperture and the tonneau cover is in the open position.

5. The motor vehicle of claim 4 wherein said rib is positioned substantially parallel to said end section.

6. The motor vehicle of claim 3 wherein said key includes a top portion and a rail portion, said rail portion disposed in said aperture, said end section being sandwiched between said top portion and said annular body.

7. The motor vehicle of claim 3 wherein said aperture includes a first elongated portion and a second elongated portion orthogonally overlying said first elongated portion.

8. A vehicle having a first sidewall, a second sidewall, a bed and a tailgate defining a cargo area comprising:

a tonneau cover having a first panel hingedly coupled to a second panel, said first panel movable from an open position to a closed position; and a striker assembly including a frame, a striker bar and a bumper, said frame adapted to be coupled to said first sidewall, whereby said first panel is selectively coupled to said striker bar and said bumper is biasedly engaged by said first panel when said first panel is in said closed position.

9. The vehicle of claim 8 wherein said frame includes a first section, a second section and an end section interconnecting said first and second sections.

10. The vehicle of claim 9 wherein said end section includes an aperture for receipt of said bumper.

11. The vehicle of claim 10 wherein said bumper includes a body and a key integrally formed with and outwardly extending from said body and wherein said aperture includes an elongated portion, said key engaging said elongated portion.

12. The vehicle of claim 9 wherein said bumper is coupled to said end section and biasedly engaged with said second section.

13. The vehicle of claim 8 further including a second striker assembly coupled to said second sidewall.

14. The vehicle of claim 13 wherein said second striker assembly includes a second bumper whereby said bumpers are adapted to align said first panel with the first sidewall and the second sidewall of the vehicle.

15. The vehicle of claim 14 wherein said bumpers are adapted to dissipate energy input by said first panel.

16. The vehicle of claim 15 wherein said bumpers include an annular body and a rib.

17. The vehicle of claim 8 wherein said first panel includes a latch selectively engagable with said striker bar and said bumper biasedly engages said latch when said first panel is in said closed position.

* * * * *